April 21, 1959

G. A. KRUDER 2,882,839

METHOD AND APPARATUS FOR DELIVERING
AND SCALING DOUGH

Filed July 11, 1955

INVENTOR
GEORGE A. KRUDER
BY *Bradley Cohn*
ATTORNEY

United States Patent Office 2,882,839
Patented Apr. 21, 1959

2,882,839

METHOD AND APPARATUS FOR DELIVERING AND SCALING DOUGH

George A. Kruder, East Norwalk, Conn., assignor to American Machine & Foundry Company, a corporation of New Jersey Application July 11, 1955, Serial No. 521,171

10 Claims. (Cl. 107—54)

This invention relates to the delivery and scaling of developed bread dough from a closed continuous mixer. In such machines, it is necessary to have an adjustable orifice to control the required back pressure in the mixer. It is further necessary in extruding the dough that the dough cross-section be first expanded to a proper size for dividing and handling.

It is an object of this invention to provide a discharge device having a short restricted portion to provide back pressure, an expansion portion to expand the dough and an extrusion portion for delivering a dough piece of correct size for panning without intermediate sheeting and curling operations.

It is a further object of this invention that such device will perform these desired functions while eliminating stagnant regions and without causing stratification or coarse spots in the dough with resultant weak crumb structure in the baked product.

It is a further object of this invention to produce the desired results with a minimum of wall area to prevent destruction of dough development while providing a smooth crust on the bread.

A further object of this invention is to provide a dough nozzle that suitably shapes the dough while delivering uniform flow for accurate scaling.

It is an object of the invention to provide a delivery nozzle and scaling means for continuous dough production.

The novel features which I believe to be characteristic of my invention are set forth with particularity in the appended claims. My invention itself, however, both as to organization and method of operation, may be understood by reference to the following description taken in connection with the accompanying drawing in which:

Figure 1:
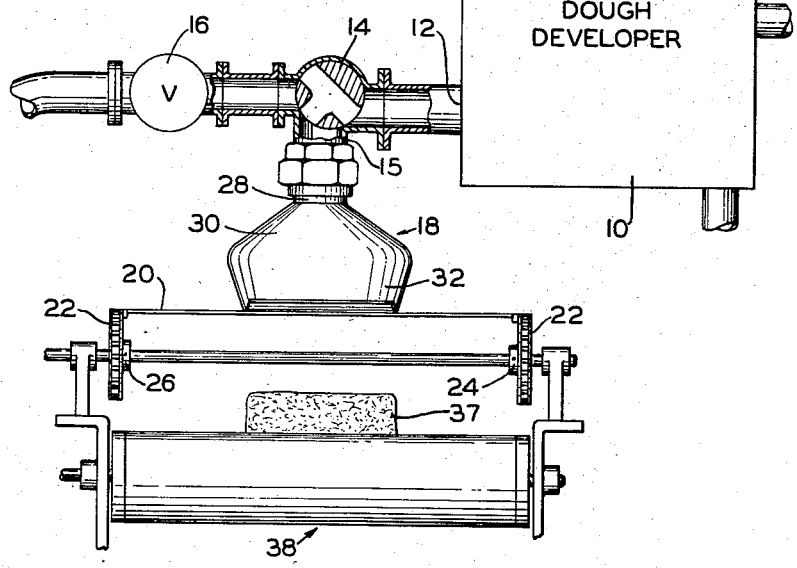
Fig. 1 shows in elevation a continuous mixer or developer equipped with a discharge device embodying the invention and including the restricting valve and expanding nozzle in combination with a cut-off or scaling knife.

With reference to Fig. 1, the dough is developed in continuous developer 10 having the outlet 12 leading to the three-way valve 14. A preferred embodiment of the developer 10 may be of the type shown in the co-pending application of David Bandel, Ser. No. 423,596 filed April 16, 1954. At the start-up of a run, three-way valve 14 may be adjusted in a position that delivers dough through the valve 16 from which it may be recycled if desired. As properly developed dough begins to run, valve 16 is closed and valve 14 is adjusted to deliver the dough into the discharge device generally designated as 18 in Fig. 1. Valve 14, however, is rotationally adjusted so that the desired back pressure is maintained in the developer, as for example 40 p.s.i.g.

The nozzle 29 of the discharge device must be substantially larger in cross-sectional area at its delivery point than at the entrance point from the valve 14 to permit a suitable expansion of the dough for scaling. However, the taper must be such as to both eliminate stagnant regions and also the nozzle must be shaped so that the dough does not draw away from the sides of the taper, that is, not expand to full size but discharge with a cross-sectional area less than the area of the discharge orifice of the nozzle with consequent failure of scaling uniformity.

When the dough is extruded from the nozzle 18 it may be cut off by a cutting member 20 secured to a pair of parallel endless chains 22 moving about sprockets 24, 26 driven by means not shown. The cutting member 20 is preferably a knife blade as shown. A wire may be substituted in some cases, but has been found frequently to leave a "tail" on the severed dough.

Figure 2:
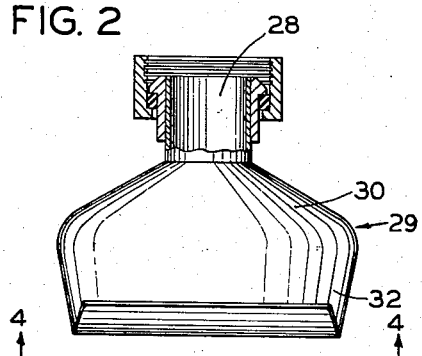
Fig. 2 shows a front elevation of the nozzle partly in section and taken along the line 2—2 of Fig. 3.
Figure 3:
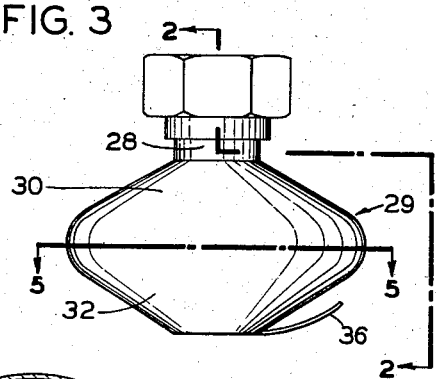
Fig. 3 shows a side elevation of the nozzle.
Figures 4, 5:
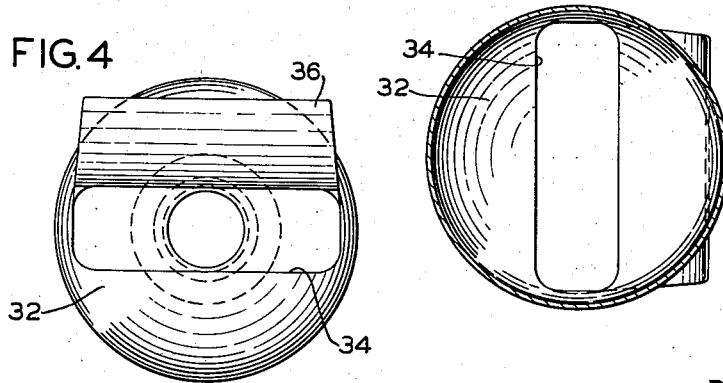
Fig. 4 is a bottom plan view thereof taken on the line 4—4 of Fig. 2.
Fig. 5 is a sectional view taken on the line 5—5 of Fig. 3.

As shown in Fig. 2, the nozzle 29 has an initial restricted neck 28 suitably secured by a coupling nut on the outlet 15 of valve 14. Neck 28 is preferably short and soon expands to a widened flared portion 30. In portion 30 the dough expands to a greater cross-sectional area than the extruding cross-sectional area. From portion 30 the nozzle tapers down at 32 to prevent the dough from drawing away from the inner wall of the nozzle. The exit orifice 34 as shown in Figs. 4 and 5 is rectangular with rounded corners and accordingly extrudes a slug of dough similarly shaped. Wire guide lip 36 extends from the leading edge of orifice 34.

In operation, the continuous mass of dough coming from developer 10, through valve 14 expands within the flared portion 30 of the nozzle 29 and it is then uniformly compressed along wall portion 32. The rectangular slug of dough is then extruded from orifice 34. Cutting member 20 moving in timed sequence is guided across the orifice by lip 36 to sever a piece of dough 37 and deposit it into pans or upon a continuous conveyor 38 as shown.

For a given machine producing 3000 to 4500 pounds of bread dough per hour and having an internal pressure between 40 and 90 p.s.i.g. it has been found that the size of valve outlet 15 is critical. One having a two inch diameter proved satisfactory whereas one with a one-and-a-half inch diameter under normal production rates gives a stratified weak crumb structure to the bread baked from the dough. Too large a diameter needlessly and deleteriously increases dough stagnation in the interior of valve 15.

It has been found that the diameter must be substantially larger in cross-sectional area above the extrusion hole than at the hole, but at the same time it should be tapered as at 32 so as to eliminate stagnant regions by a slight compression on the dough and some increase in its velocity. When the nozzle does not taper down at the extrusion hole the dough does not flow out with smooth sides but, on the contrary, has coarse non-uniform grain at the end of a loaf, and a rough crust of poor color uniformity results. Thus, I have discovered that the enlarged portion 30 must be of a critical diameter with respect to the discharge orifice, and the sloping walls 32 must be of a gradual taper to prevent stagnation and provide a smooth surface to the dough.

It has also been noted that with a very hot dough (over 99° F.) the criticality is reduced. That is, a pipe diameter and nozzle that will not work with cool doughs will work with hot doughs. However, the cooler dough temperature is desirable for better bread dough molding and better bread shape. Further, with dough temperatures above 104° F. dough development in the pan is not stable, and coarse low-volume bread can result.

I claim:

1. In a device for extruding dough from a closed continuous dough developer, the combination with an adjustable restricted orifice through which the dough is delivered from the developer and by which back pressure in the developer is created, of a nozzle having a short narrow neck leading from said orifice to a gradually flaring portion, and a subsequent tapered portion tapering down to a reduced delivery orifice substantially rectangular in shape.

2. In a device for extruding dough from a continuous dough developer of the closed type, the combination with an adjustable restricted delivery orifice, of a nozzle in communication with said adjustable delivery orifice, said nozzle comprising a short narrow neck, a bell-like enlarged portion for expanding and slowing down the velocity of dough received from the restricted orifice, and a subsequent tapered portion having a final discharge orifice of smaller cross-sectional area than the cross-sectional area of said enlarged portion.

3. A device substantially as claimed in claim 2 wherein said discharge orifice is substantially rectangular in shape.

4. A continuous dough delivery and scaling device communicating with a source of dough under pressure comprising, a delivery tube extending from said source, a nozzle communicating with said delivery tube, said nozzle having an initial restricted neck and a large expansion chamber communicating with said neck and gradually tapering to form a delivery orifice, said orifice being substantially rectilinear in cross-section, said delivery orifice having a lesser cross-sectional area than said chamber, a cutting member mounted to move past and across said orifice at predetermined time intervals, and means to guide said cutting member across said orifice at said intervals, whereby dough delivered from said source under pressure and delivered to said nozzle is expanded and delivered from said orifice at a uniform rate.

5. A continuous dough delivery and scaling device communicating with a source of dough under pressure comprising a delivery tube extending from said source, a nozzle communicating with said delivery tube, said nozzle having an initial restricted neck and a large expansion chamber communicating with said neck and gradually tapering to form a delivery orifice, said delivery orifice having a lesser cross-sectional area than the expansion chamber of said nozzle, a cutting member mounted to move past and across said orifice at predetermined time intervals, and means to guide said cutting member across said orifice at said intervals, whereby dough delivered from said source under pressure and delivered to said nozzle is expanded and delivered from said orifice of lesser cross-sectional area at a uniform rate.

6. A continuous dough delivery and scaling device communicating with a source of dough under pressure comprising a delivery tube extending from said source, a nozzle communicating with said delivery tube, said nozzle having an initial restricted neck and a large expansion chamber communicating with said neck and gradually tapering to form a delivery orifice, said delivery orifice having a lesser cross-sectional area than the expansion chamber of said nozzle, the delivery edge of said orifice in one plane, a cutting member mounted to move across said delivery orifice in close contact therewith, a cam extension at the leading edge of said delivery orifice to guide said cutting member to and along said edge of said delivery orifice whereby dough delivered from said source under pressure and delivered to said nozzle is expanded and delivered from said orifice at a uniform rate for scaling severance therefrom by said cutting member.

7. The method of delivering developed dough from a confined pressure vessel comprising, conducting the dough out of said vessel through a restricted discharge orifice, gently expanding said dough and reducing its velocity, and then gradually compressing said dough, extruding said compressed dough into an area at atmospheric pressure and rapidly severing predetermined lump portions of said extruded dough mass.

8. The method of continuously delivering developed dough from a confined source under pressure comprising, conducting said dough through an elongated discharge passage to maintain a back pressure in said source, gently expanding said dough and slowing its velocity, then gently compressing said dough and extruding said dough to atmospheric pressure and severing predetermined lump portions from said extruded dough.

9. A continuous dough delivery and scaling device communicating with a source of dough under pressure comprising a delivery tube extending from said source, a nozzle communicating with said delivery tube, said nozzle having an initial restricted neck and a large expansion chamber communicating with said neck and gradually tapering to form a delivery orifice, said orifice being substantially rectilinear in cross-section, said delivery orifice having a lesser cross-sectional area than said chamber, and a cutting member mounted to move past and across said orifice at predetermined time intervals whereby dough delivered from said source under pressure and delivered to said nozzle is expanded and delivered from said orifice at a uniform rate.

10. In a device for extruding dough from a continuous dough developer of the closed type and having a discharge orifice therein, a T-shaped fitting having three communicating portions, one portion of the T-shaped fitting communicating with said discharge orifice of the developer, a second portion of the T-shaped fitting having a shut-off valve, a three-way adjustable valve operatively positioned at the intersection of the communicating portions of the T, and a nozzle secured to the third portion of the T, said nozzle comprising a short neck of small diameter and an enlarged flared portion communicating with said neck in which dough delivered from said short neck can be expanded in volume, a discharge orifice of substantially smaller cross-sectional area than said enlarged portion through which the dough may be discharged, and a connecting tapered portion communicating said discharge orifice with said enlarged portion.

References Cited in the file of this patent

UNITED STATES PATENTS

| | | |
|---|---|---|
| 2,679,866 | Crawford | June 1, 1954 |
| 2,731,925 | Carvel | Jan. 24, 1956 |